(12) United States Patent  
Roes et al.

(10) Patent No.: US 8,396,373 B2
(45) Date of Patent: Mar. 12, 2013

(54) MODULATING RETRO-REFLECTOR OPTICAL COMMUNICATION USING POLARIZATION DIFFERENTIAL SIGNALING

(75) Inventors: Michael A. Roes, San Diego, CA (US); Jonathan R. O'Brien, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 431 days.

(21) Appl. No.: 12/413,145

(22) Filed: Mar. 27, 2009

(65) Prior Publication Data

US 2009/0279903 A1 Nov. 12, 2009

Related U.S. Application Data

(60) Provisional application No. 61/040,054, filed on Mar. 27, 2008.

(51) Int. Cl.
*H04B 10/00* (2006.01)
*G02B 26/00* (2006.01)

(52) U.S. Cl. .................. 398/170; 398/169; 359/237

(58) Field of Classification Search .......... 398/169–170; 359/237–238, 244–245, 315, 318; 12/169–170
See application file for complete search history.

(56) References Cited

U.S. PATENT DOCUMENTS

| | | | | | |
|---|---|---|---|---|---|
| 3,504,182 | A | * | 3/1970 | Fiala et al. | 398/129 |
| 4,131,791 | A | * | 12/1978 | Lego, Jr. | 398/171 |
| 4,731,879 | A | * | 3/1988 | Sepp et al. | 398/170 |
| 5,056,895 | A | * | 10/1991 | Kahn | 349/114 |
| 5,414,540 | A | * | 5/1995 | Patel et al. | 349/196 |
| 5,731,579 | A | * | 3/1998 | Woods | 250/227.17 |
| 6,027,216 | A | * | 2/2000 | Guyton et al. | 351/200 |
| 6,154,299 | A | | 11/2000 | Gilbreath et al. | |
| 6,493,123 | B1 | | 12/2002 | Mansell et al. | |
| 6,507,441 | B1 | * | 1/2003 | Eisenberg et al. | 359/627 |
| 7,813,040 | B2 | * | 10/2010 | Colbourne et al. | 359/489.08 |
| 2003/0147651 | A1 | * | 8/2003 | Roes et al. | 398/108 |
| 2007/0127928 | A1 | * | 6/2007 | Varshneya et al. | 398/135 |
| 2009/0147341 | A1 | * | 6/2009 | Muenter et al. | 359/238 |

OTHER PUBLICATIONS

PCT International Search Report and Written Opinion mailed Jul. 16, 2009; International Application No. PCT/US2009/038635, 12 pages.

* cited by examiner

*Primary Examiner* — Dawayne A Pinkney
(74) *Attorney, Agent, or Firm* — Kilpatrick Townsend & Stockton LLP

(57) ABSTRACT

A retroreflector coupled with a polarization rotator is provided according to some embodiments. The polarization rotator can be designed and/or configured to introduce a fraction of a wavelength phase difference in a received beam of light prior to reflecting the beam of light back toward the source of the light. By switching the state of the polarization rotator a communication signal can be modulated on the return beam of light.

19 Claims, 4 Drawing Sheets

MODULATING RETRO-REFLECTOR OPTICAL COMMUNICATION USING POLARIZATION DIFFERENTIAL SIGNALING

CROSS-REFERENCES TO RELATED APPLICATIONS

This application claims the benefit of commonly assigned U.S. Provisional Patent Application No. 61/040,054, filed Mar. 27, 2008, entitled "Modulating Retro-Reflector Optical Communication Using Polarization Differential Signaling," the disclosure of which is herein incorporated by reference for all purposes.

BACKGROUND

Retroreflector based communication systems often use a retroreflector coupled with a binary modulator to encoded an optical signal received from a distant source. Retroreflectors by their nature reflect light back toward the light source, by introducing binary modulation on the returned signal, data can be encoded on the return optical beam. Such schemes provide low power alternatives to communication because the retroreflector does not produce the return optical signal. Retroreflectors typically use shutters to encode data on the return optical signal. Atmospheric scintillations can be a source of noise in retroreflector type communication systems and can affect amplitude based modulation.

BRIEF SUMMARY

A modulating retro-reflector is provided according to one embodiment, that includes a retroreflector, an optical modulator and/or a data processor. The retroreflector can be configured to receive an optical signal from a source through an entrance aperture and reflect the optical signal toward the source. The optical modulator can be coupled with the retroreflector and/or can be configured to modulate the polarization of the optical signal. The data processor can be coupled with the optical modulator and/or can be configured to produce a data stream, wherein the retroreflector modulates the optical signal according to the data stream. In some embodiments, the modulating retroreflector can include an optical receiver communicatively coupled with the data processor and configured to receive the optical signal, wherein the information encoded on the data stream is provided in response to information encoded on the optical signal.

In some embodiments, the optical modulator can include a liquid crystal device, a ferroelectric liquid crystal device, and/or a polarization rotator. In some embodiments, the optical modulator can be coupled with the entrance aperture of the retroreflector. In some embodiments, the optical modulator can be configured to introduce a one-eighth wavelength shift in the optical signal when the optical signal passes through the modulator. In some embodiments, the optical modulator can be configured to introduce a one-quarter wavelength shift in the optical signal when the optical signal passes through the modulator.

A method is also provided according to some embodiments. An optical signal can be received from a source along a an optical path, and a data stream can be received. The polarization of the optical signal can be modulated according to the data stream creating a modulated optical signal. The modulated optical signal can then returned to the source along substantially the same optical path.

A optical communication device is also provided according to some embodiments that includes reflecting means and modulating means. The reflecting means can be configured to receive an optical signal from a source through an entrance aperture and return the optical signal toward the source. The modulating means can be used to modulate the polarization of the optical signal.

DETAILED DESCRIPTION

Figure 1:
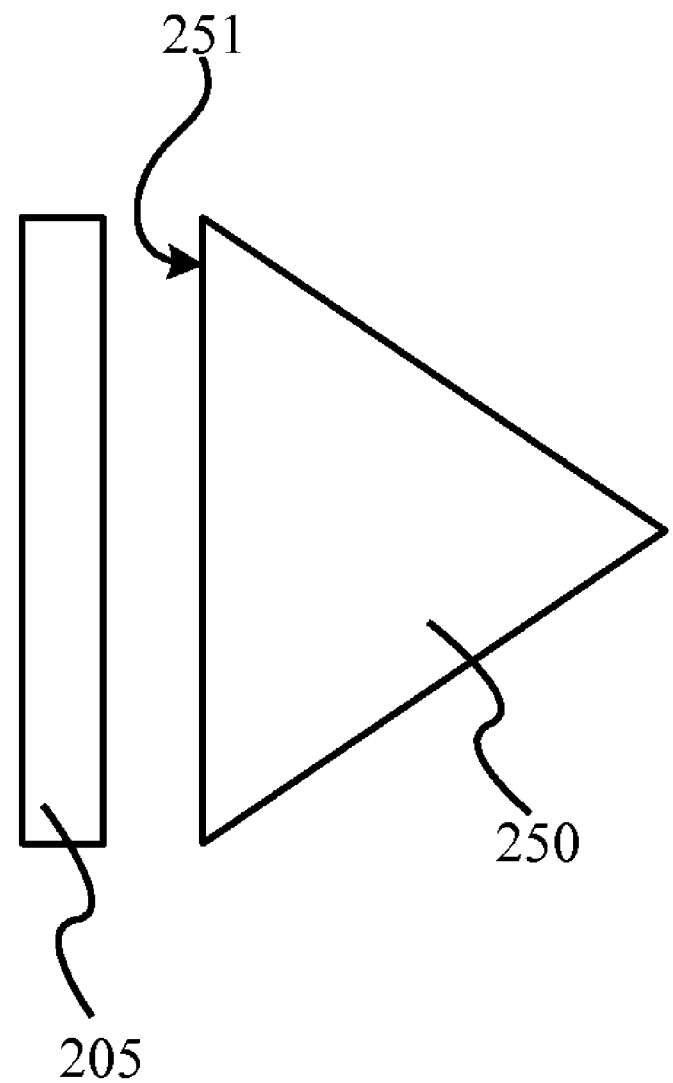
FIG. 1 shows a drawing of a 2-dimensional retroreflector coupled with a polarization rotator according to some embodiments.
Figure 1:
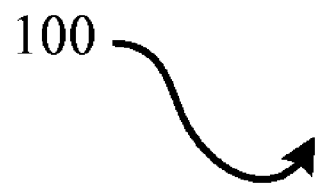

Embodiments disclosed herein provide for a retroreflector coupled with a polarization rotator. Passive optical communication can be achieved by modulating the polarization of a received beam of light using the polarization rotator and reflecting the beam of light back toward the light source.

As used throughout this disclosure the term "polarization rotator" is defined as any device that can modulate the polarization state of an incoming light beam depending on the state or the polarization rotator. Polarization rotators can include liquid crystal devices, ferroelectric liquid crystal devices, wave plates, retarders, birefringence plates, and/or any electrically-rotatable birefringent material. In some embodiments, polarization rotators can be transmissive or reflective.

Polarization rotators can be electrically switchable. For example, a polarization rotator can switch between two states: a polarizing state and a non-polarizing state. In a polarizing state, for example, a transmissive polarization rotator polarizes light as the light passes through. In a non-polarizing state, for example, a transmissive polarization rotator does not affect the polarization of light as the light passes through. Thus, in some embodiments, the polarization state can be switched between passing light without changing the polarization state and changing the polarization state. In some embodiments, a polarization rotator can change the polarization state of an incoming beam of light by a fixed amount. For example, a quarter wave polarization rotator can change the phase difference a quarter wavelength, a half wave polarization rotator can change the phase difference half a wavelength, and a one-eighth wave polarization rotator can change the phase difference one-eighth a wavelength. In some embodiments, a quarter wave polarization rotator can change circularly polarized light into linear polarized light and vice versa. In some embodiments, two passes through a one-eighth wave polarization rotator effectively acts like a single quarter wave polarization rotator and can change circularly polarized light into linear polarized light and vice versa.

A retroreflector can be any device that reflects light from a source back to the source along substantially the same path or a parallel path with a minimum scattering of light. For example, an electromagnetic wave front can be reflected back along a vector that is parallel to but opposite in direction from the wave front's source using a retroreflector. A retroreflector can reflect light back toward the source when the incident angle of the light is greater than zero. Some retroreflector can reflect light back toward the source at angles up to 90°.

In some embodiments, a retroreflector can comprise a truncated corner of a cube of transparent material. In some embodiments, a retroreflector can comprise three mutually orthogonal flat mirrors. In some embodiments, a retroreflector can comprise a cat's eye retroreflector. In some embodiments, a retroreflector can comprise a plurality of smaller retroreflectors arranged in an array.

FIG. 1 shows configuration 100 with polarization rotator 205 coupled with retroreflector 250. In some embodiments, polarization rotator 205 can be coupled with and/or near entrance aperture 251 of retroreflector 250. Polarization rotator 205 can be coupled directly with retroreflector 250 or can be placed in front of retroreflector 250 with a space in between.

By switching the state of polarization rotator 205, an optical signal can be modulated on a received beam of light. For example, polarization rotator 205 can be a one-eighth wave polarization rotator. Thus, when circularly polarized light passes through polarization rotator 205 in the "off" state, the beam of light remains circularly polarized. When circularly polarized light passes through polarization rotator 205 in the "on" state, the polarization of the light is shifted one-eighth of a wavelength. After reflection at retroreflector 250, the light is again shifted one-eighth of a wavelength and is returned to the source of the light as linearly polarized light. Therefore, by modulating between the "on" state and the "off" state, a signal can be encoded on a return beam of light.

Figure 2:
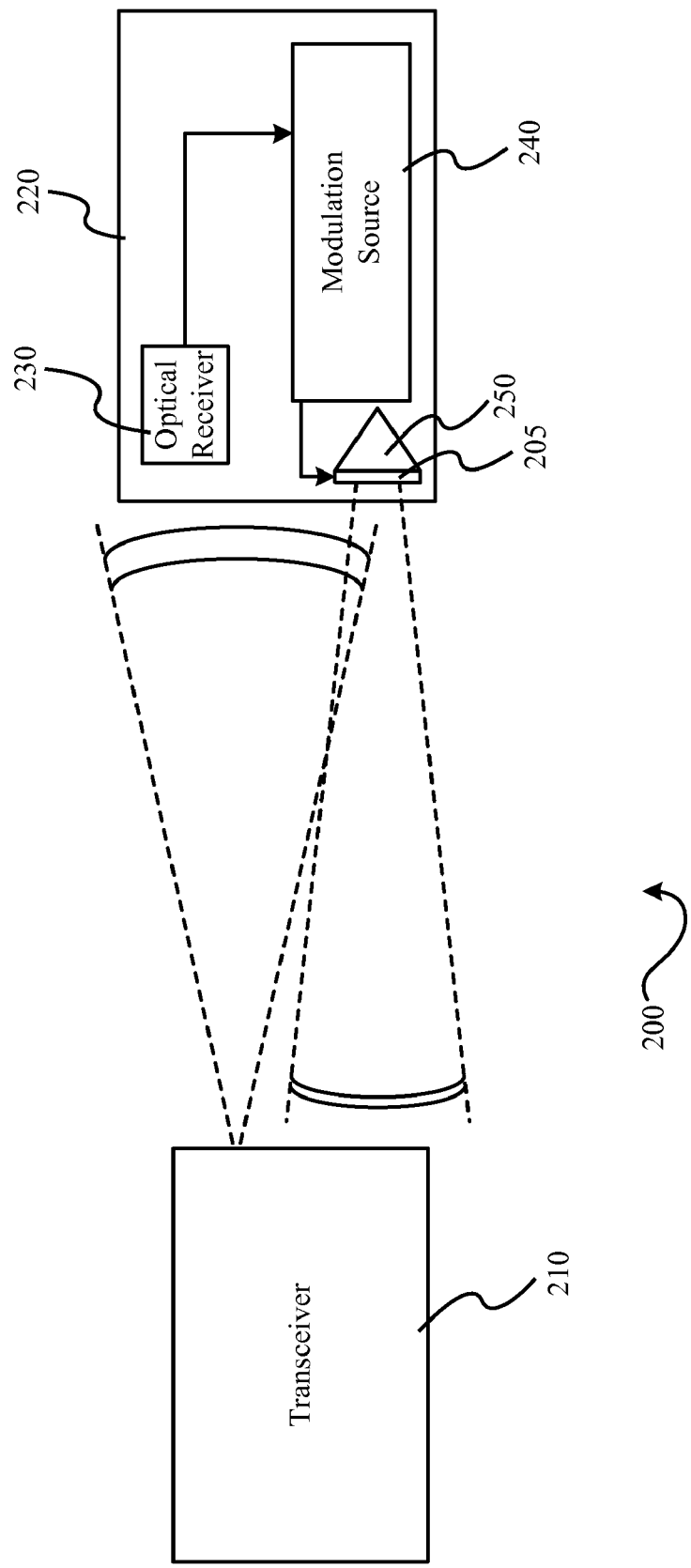
FIG. 2 shows an optical communication system using a polarization rotator with a retroreflector according to some embodiments.

FIG. 2 shows optical communication system 200 employing polarization rotator 205 coupled with retroreflector 250 according to one embodiment. As shown, transceiver 210 can transmit an information bearing optical signal toward optical tag 220. In some embodiments, the information bearing optical signal can be encoded using changes in the polarization state of the optical signal or any other modulation scheme. Optical receiver 230 can be disposed within optical tag 220 to receive the optical signal. Optical receiver 230 can be coupled with modulation source 240, which can create and/or modify information encoded on the optical signal. An output of modulation source 240 can be electronically sent to polarization rotator 205, which can modulate the polarization of the optical signal according to the output of the modulation source 240. Modulation source 240, can send an electrical signal that switches the polarization state of polarization rotator 205. The amplitude of the electrical signal can be matched to the required driving voltage of polarization rotator 205.

Polarization rotator 205 can switch between allowing light to pass without a phase shift and shifting the phase of the light a fixed amount. For example, the phase of the optical signal can be shifted as it passes through polarization rotator 205 before and after reflection at retroreflector 250 when the polarization rotator is in the "on" state. In this manner, information can be encoded on the return optical signal after reflection at retroreflector 250. According to some embodiments, some of the elements shown within optical tag 220 may be included within an integrated retro reflector assembly. In other embodiments, various optical components can ay be included within the assembly. In yet other embodiments, a combination of optical and electrical components are included within the assembly.

In some embodiments, transceiver 210 and/or optical receiver 230 can include two optical receivers. Each receiver can receive light in a different orthogonal polarization state. For example, the two receivers can each include a polarization filter that is orthogonal to the other receivers filter. The transceiver can then compare the power received at the two receivers to differentiate between the two polarization states and decode the received signal.

Figure 3A:
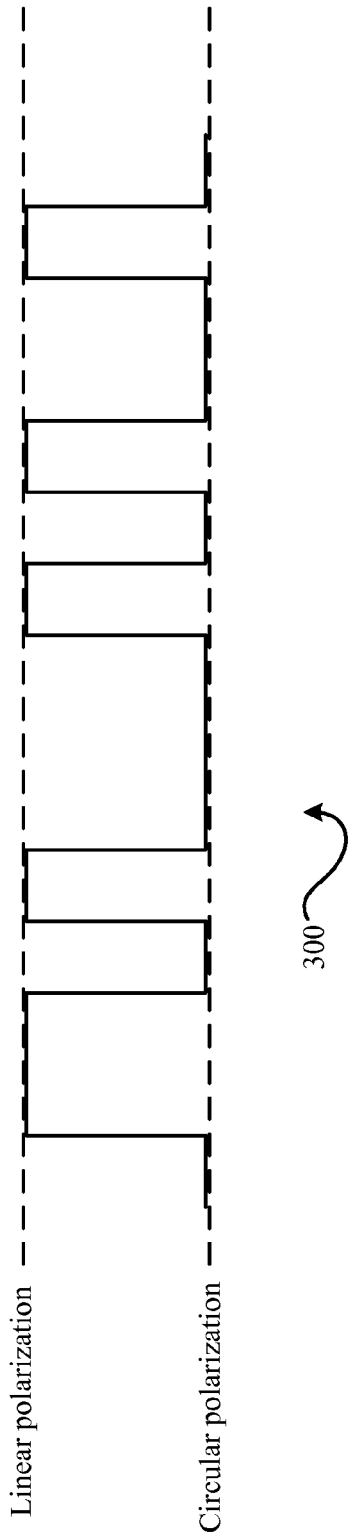
FIGS. 3A and 3B show sample signals using a polarization modulation according to some embodiments.

FIG. 3A shows a sample optical signal 300 with information encoded using changes in the polarization state of the optical signal using a one-eighth wavelength polarization rotator coupled with a retroreflector, according to some embodiments. Binary information can be encoded based on the polarization state of the optical signal. For example, circularly polarized light can indicate zero value and linear polarized light can indicate a one value, and vice versa.

Figure 3B:
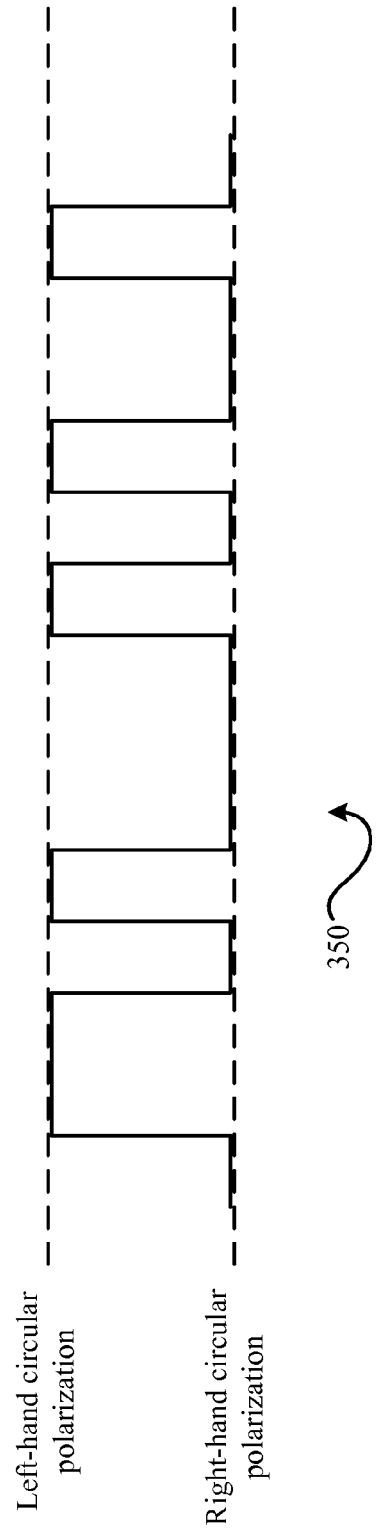

FIG. 3B shows a sample optical signal 350 with information encoded using changes in the polarization state of the optical signal using a quarter-wavelength polarization rotator coupled with a retroreflector, according to some embodiments. As shown, optical signal 350 switches between right-hand polarization and left-hand polarization states.

Figure 4:
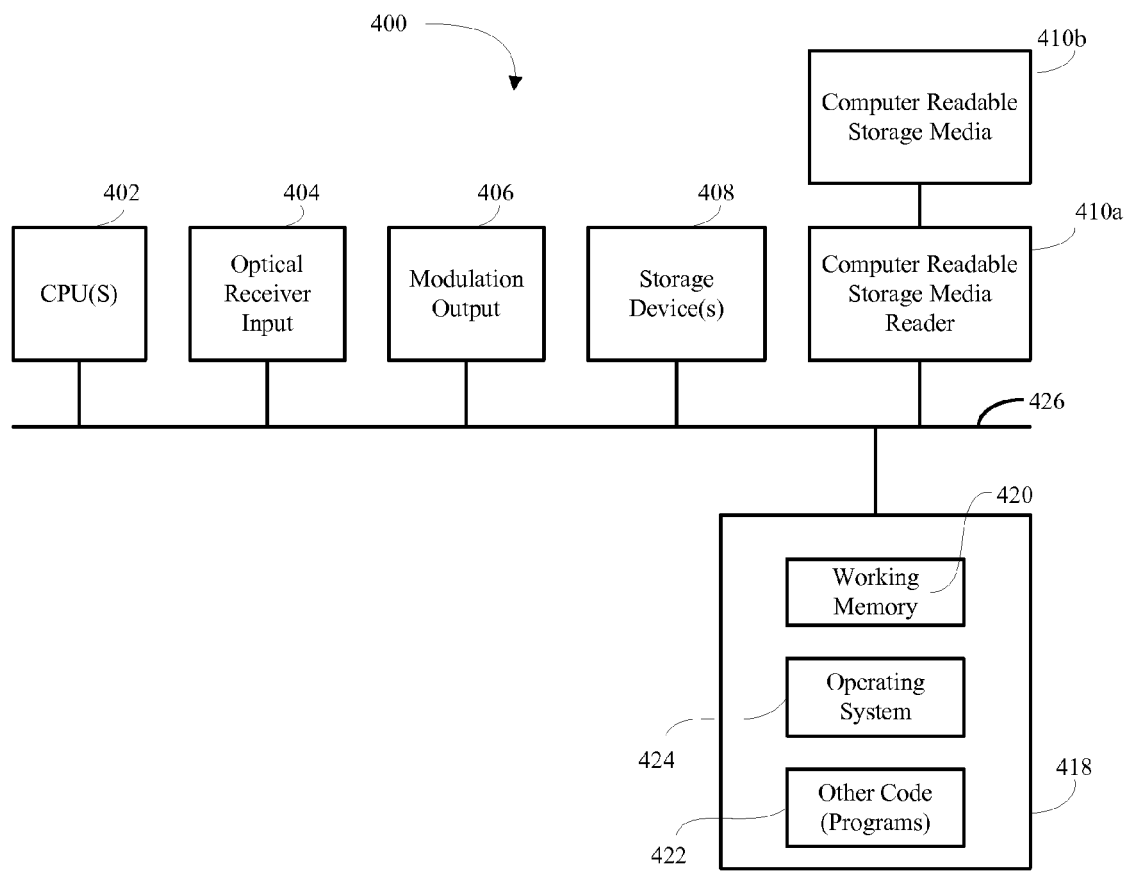
FIG. 4 shows a schematic representation of a computational device that can be used to implement various embodiments.

Modulation source 240 shown in FIG. 2 can comprise any type of processor, controller, and/or computation device. FIG. 4 broadly illustrates an example of a computation device 400 that can be used as the modulation source in a separated or more integrated manner. The computational device 400 can include hardware elements that are electrically coupled via bus 426. The hardware elements can include processor 402, optical receiver input 404 that can be coupled, for example, with optical receiver 230 shown in FIG. 2, modulation output 406, storage device 408, computer-readable storage media reader 410a, and/or memory 418. The computer-readable storage media reader 410a can be coupled with a computer-readable storage medium 410b, the combination comprehensively representing remote, local, fixed, and/or removable storage devices plus storage media for temporarily and/or more permanently containing computer-readable information. Moreover, control, input, output, and/or networking hardware can also be coupled with bus 426.

The computational device 400 can include software elements, shown as being currently located within working memory 420, including an operating system 424 and other code 422, such as a program designed to implement methods of the invention. It will be apparent to those skilled in the art that substantial variations can be used in accordance with specific requirements.

In some embodiments, software stored within memory 418 can include instructions for providing a modulation signal to a polarization rotator. For example, computational device 400 can receive a signal from optical receiver input 404 and provide a modulation signal through modulation output 406 to a polarization rotator in response.

In some embodiments, a polarization rotator that is coupled with a retroreflector, for example, as shown in FIG. 1, can be configured to couple with a communication device. In some embodiments, when the polarization rotator is coupled with the communication device, the polarization rotator can receive a modulation signal from the communication device and modulate an optical signal accordingly.

While embodiments have been described using polarization modulation, various other modulation schemes can also be used in conjunction with polarization modulation. For example, amplitude modulation can also be introduced in the optical signal along with polarization modulation.

While the principles of the disclosure have been described above in connection with specific apparatuses and methods, it is to be clearly understood that this description is made only by way of example and not as limitation on the scope of the disclosure.

What is claimed is:

1. A modulating retroreflector, comprising:
a retroreflector positioned to receive an optical signal from a source through an entrance aperture and reflect the optical signal toward the source;
an optical polarization modulator coupled with the retroreflector and positioned to modulate the polarization of the optical signal such that any interference from atmospheric scintillation is minimized; and
a data processor coupled with the optical modulator and configured to produce a data stream, wherein the optical polarization modulator modulates the optical signal according to the data stream;
a first optical receiver configured to receive light in a first polarization state; and
a second optical receiver configured to receive light in a second polarization state, wherein:
the first polarization state and the second polarization state represent approximately orthogonal polarization states; and
the data processor compares a power received at the first optical receiver to a power received at the second optical receiver to differentiate between the first polarization state and the second polarization state and decode the optical signal from the source.

2. The modulating retroreflector according to claim 1, wherein the information encoded on the data stream is provided in response to information encoded on the optical signal.

3. The modulating retroreflector according to claim 1, wherein the optical modulator comprises a liquid crystal device.

4. The modulating retroreflector according to claim 1, wherein the optical modulator comprises a ferroelectric liquid crystal device.

5. The modulating retroreflector according to claim 1, wherein the optical modulator comprises a wave plate.

6. The modulating retroreflector according to claim 1, wherein the optical modulator comprises an polarization rotator.

7. The modulating retroreflector according to claim 1, wherein the optical modulator is coupled with the entrance aperture of the retroreflector.

8. The modulating retroreflector according to claim 1, wherein the optical modulator is configured to introduce a one-eighth wavelength shift in the optical signal when the optical signal passes through the modulator.

9. The modulating retroreflector according to claim 1, wherein the optical modulator is configured to introduce a one-quarter wavelength shift in the optical signal when the optical signal passes through the modulator.

10. A method comprising:
receiving an optical signal from a source along an optical path at a first optical receiver configured to receive light in a first polarization state;
receiving the optical signal from the source along the optical path at a second optical receiver configured to receive light in a second polarization state, wherein the first polarization state and the second polarization state represent approximately orthogonal polarization states;
comparing a power received at the first optical receiver to a power received at the second optical receiver to differentiate between the first polarization state and the second polarization state and decode the optical signal from the source;
receiving a data stream;
modulating the polarization of the optical signal according to the data stream creating a modulated optical signal such that any interference from atmospheric scintillation is minimized; and
returning the modulated optical signal to the source along substantially the same optical path.

11. The method according to claim 10, wherein the modulating introduces a one-eighth wavelength shift in the optical signal.

12. The method according to claim 10, wherein modulating introduces a one-quarter wavelength shift in the optical signal.

13. The method according to claim 10, wherein modulating introduces a one-half wavelength shift in the optical signal.

14. An optical communication device, comprising:
reflecting means for receiving an optical signal from a source through an entrance aperture and returning the optical signal toward the source
a first optical receiving means for receiving light in a first polarization state;
a second optical receiving means for receiving light in a second polarization state, wherein the first polarization state and the second polarization state represent approximately orthogonal polarization states;
a data processing means for comparing a power received at the first optical receiver to a power received at the second optical receiver to differentiate between the first polarization state and the second polarization state and decode the optical signal from the source; and
modulating means for modulating the polarization of the optical signal such that any interference from atmospheric scintillation is minimized.

15. The optical communication device according to claim 14, wherein the data processing means is coupled with the modulating means for providing a data stream, wherein the modulating means modulates the optical signal according to the data stream.

16. The optical communication device according to claim 14, wherein the modulating means comprises a liquid crystal device.

17. The optical communication device according to claim 14, wherein optical signal is linearly polarized and the modulating means modulates the optical signal by circularly polarizing portions of the optical signal.

18. The optical communication device according to claim 14, wherein optical signal is circularly polarized and the modulating means modulates the optical signal by linearly polarizing portions of the optical signal.

19. The optical communication device according to claim 14, wherein optical signal is right-hand circularly polarized and the modulating means modulates the optical signal by left-hand polarizing portions of the optical signal.

* * * * *